(12) United States Patent
Horvat et al.

(10) Patent No.: US 7,739,520 B2
(45) Date of Patent: Jun. 15, 2010

(54) DATA PROCESSING DEVICE

(75) Inventors: Helmut Horvat, Graz (AT); Jan Otterstedt, Unterhaching (DE); Stefan Wallstab, München (DE)

(73) Assignee: Infineon Technologies AG, Neubiberg (DE)

( * ) Notice: Subject to any disclaimer, the term of this patent is extended or adjusted under 35 U.S.C. 154(b) by 1220 days.

(21) Appl. No.: 10/638,659

(22) Filed: Aug. 11, 2003

(65) Prior Publication Data
US 2004/0034789 A1 Feb. 19, 2004

Related U.S. Application Data

(63) Continuation of application No. PCT/DE02/00176, filed on Jan. 21, 2002.

(30) Foreign Application Priority Data

Feb. 9, 2001 (DE) ................. 101 05 987

(51) Int. Cl.
*G06F 12/14* (2006.01)
(52) U.S. Cl. .................. 713/194; 713/189
(58) Field of Classification Search ........ None
See application file for complete search history.

(56) References Cited

U.S. PATENT DOCUMENTS

| | | | | |
|---|---|---|---|---|
| 4,757,468 A * | 7/1988 | Domenik et al. | ............ | 713/193 |
| 5,293,424 A * | 3/1994 | Holtey et al. | ................. | 713/193 |
| 5,446,796 A * | 8/1995 | Ishiguro et al. | ............... | 705/66 |
| 5,457,408 A | 10/1995 | Leung | | |
| 5,533,123 A | 7/1996 | Force et al. | | |
| 5,594,227 A * | 1/1997 | Deo | ............ | 235/380 |
| 5,600,818 A * | 2/1997 | Weikmann | ................. | 711/163 |
| 5,768,372 A * | 6/1998 | Sung et al. | ................. | 713/193 |
| 5,774,544 A * | 6/1998 | Lee et al. | ............ | 713/189 |
| 5,784,577 A | 7/1998 | Jacobson et al. | | |
| 5,838,165 A * | 11/1998 | Chatter | .................. | 326/38 |
| 5,838,901 A * | 11/1998 | Curd et al. | .................. | 726/26 |
| 5,915,017 A * | 6/1999 | Sung et al. | ................. | 713/187 |
| 6,059,191 A * | 5/2000 | Sedlak et al. | ............... | 235/492 |
| 6,061,603 A * | 5/2000 | Papadopoulos et al. | ....... | 700/83 |
| 6,201,296 B1 | 3/2001 | Fries et al. | | |
| 6,212,639 B1 * | 4/2001 | Erickson et al. | ............... | 726/26 |
| 6,330,624 B1 * | 12/2001 | Cromer et al. | ................. | 710/37 |
| 6,446,242 B1 * | 9/2002 | Lien et al. | ................. | 716/6 |

(Continued)

FOREIGN PATENT DOCUMENTS

DE 40 13 727 C2 10/1991

(Continued)

OTHER PUBLICATIONS

Flash memory, Wikipedia, Jun. 4, 2009.*

(Continued)

*Primary Examiner*—Kambiz Zand
*Assistant Examiner*—Peter Poltorak
(74) *Attorney, Agent, or Firm*—Dickstein, Shapiro, LLP.

(57) ABSTRACT

The invention relates to a data processing device with a functionally programmable logic circuit and a programming interface. An authorization control unit is provided, which protects the programming interface against an unauthorized access. This enables the functions of a semiconductor module to be changed in a customer-specific manner while preventing unauthorized entities from subsequently changing the functionality.

5 Claims, 2 Drawing Sheets

U.S. PATENT DOCUMENTS

| | | | |
|---|---|---|---|
| 6,560,709 B1 * | 5/2003 | Galovich | 713/185 |
| 6,621,293 B2 * | 9/2003 | Wingen | 326/37 |
| 6,654,889 B1 * | 11/2003 | Trimberger | 713/191 |
| 6,823,069 B1 * | 11/2004 | Kitajima et al. | 380/44 |
| 6,901,516 B1 * | 5/2005 | Howard et al. | 713/193 |
| 6,931,543 B1 * | 8/2005 | Pang et al. | 713/193 |
| 2001/0015919 A1 * | 8/2001 | Kean | 365/200 |
| 2001/0037438 A1 * | 11/2001 | Mathis | 711/163 |

FOREIGN PATENT DOCUMENTS

| | | |
|---|---|---|
| DE | 195 15 188 C2 | 11/1996 |
| DE | 196 39 033 C1 | 8/1997 |
| DE | 197 53 730 A1 | 6/1999 |
| EP | 0 895 164 A2 | 2/1999 |
| JP | 11-259408 | 9/1999 |
| JP | 2000-151577 | 5/2000 |
| JP | 2000-174844 | 6/2000 |
| JP | 2000-259801 | 9/2000 |
| WO | 98/08306 | 2/1998 |
| WO | 00/55746 | 9/2000 |
| WO | 00/65442 | 11/2000 |

OTHER PUBLICATIONS

Marcus Janke et al.: "Intelligente Chipkartentechnik gegen HiTech-Manipulation" [intelligent chipcard technology against HiTech manipulation], *àlaCard*, No. 26-27, 1997, pp. 315-318.

* cited by examiner

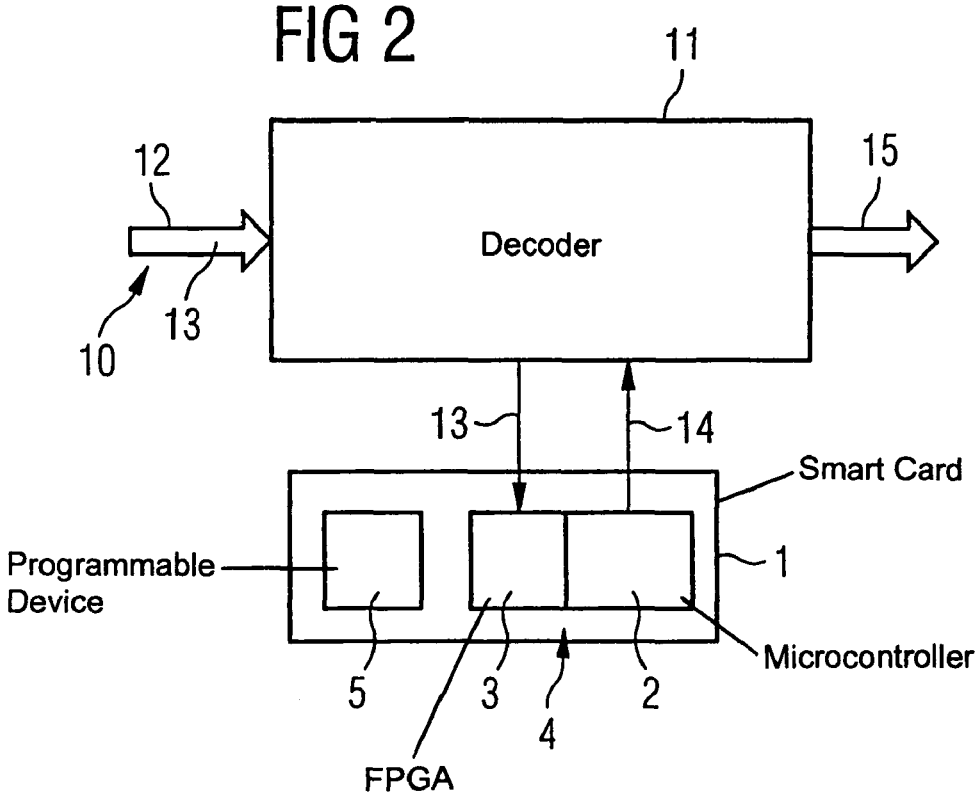
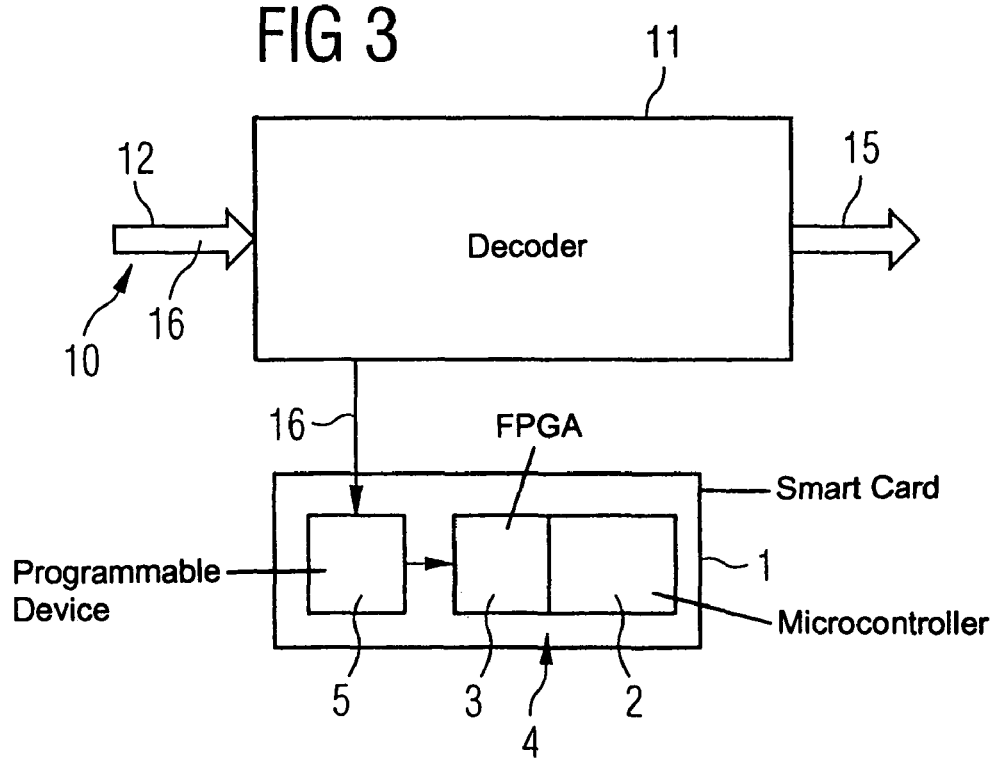

DATA PROCESSING DEVICE

CROSS REFERENCE TO RELATED APPLICATION

This application is a continuation of copending International Application No. PCT/DE02/00176, filed Jan. 21, 2002, which designated the United States and was not published in English.

BACKGROUND OF THE INVENTION

Field of the Invention

The invention relates to a data processing device with a functionally programmable logic circuit and a programming interface.

Integrated semiconductor modules can be adapted to customer-specific requirements by realizing the affected functions with software. The software can be adapted comparatively simply to the specific desires. However, software solutions are relatively slow in comparison with a hardware realization. A further known possibility is functionally programmable logic circuits, which are known for example as FPGAs (Field Programmable Gate Array). However, FPGAs offer no or only inadequate safeguards against unauthorized access. That is required, however, for use in many smart cards and safety ICs.

Published German Patent Application DE 197 53 730 A1 discloses a device for controlling an internal combustion engine, in which an authorization check is provided before executing commands on a microprocessor. However, such a device cannot be used in the case of functionally programmable logic circuits, since the logic circuit itself is the executing component.

Furthermore, Issued German Patent DE 196 39 033 C1 discloses an analysis protection mechanism for a semiconductor chip, in which the chip is covered and a manipulation detection circuit is provided for detecting removal of the covering.

SUMMARY OF THE INVENTION

It is accordingly an object of the invention to provide a data processing device, which overcomes the above-mentioned disadvantages of the prior art apparatus of this general type.

In particular, it is an object of the invention to provide a data processing device that provides simple possibilities for changing the functionality, but nevertheless enables fast data processing and satisfies stringent safety requirements.

With the foregoing and other objects in view there is provided, in accordance with the invention, a data processing device including: a functionally programmable logic circuit; a programming interface; and an authorization control unit for protecting the programming interface against an unauthorized access.

Thus, the data processing device is not only programmable, but further measures are also provided in order to prevent reprogramming by unauthorized entities. This is advantageously done in such a way that the authorization control device is realized with the functionally programmable logic circuit and the programming interface in one unit. Thus, a manipulation detection device may be provided, which discovers software and primarily hardware attacks and can initiate corresponding reactions, for example, a message to a central control station or the erasure of safety-relevant data.

In an advantageous refinement of the invention, the authorization control unit is realized by a microprocessor that can also be used for other tasks. As a result, the inventive data processing device can manage complex tasks. One area of use for this is the use as a smart card for Pay-TV applications.

Other features which are considered as characteristic for the invention are set forth in the appended claims.

Although the invention is illustrated and described herein as embodied in a data processing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a block diagram of a configuration with a smart card in normal operation; and FIG. 3 is a block diagram of a configuration with a smart card during reprogramming.

DESCRIPTION OF THE PREFERRED EMBODIMENTS

Figure 1:
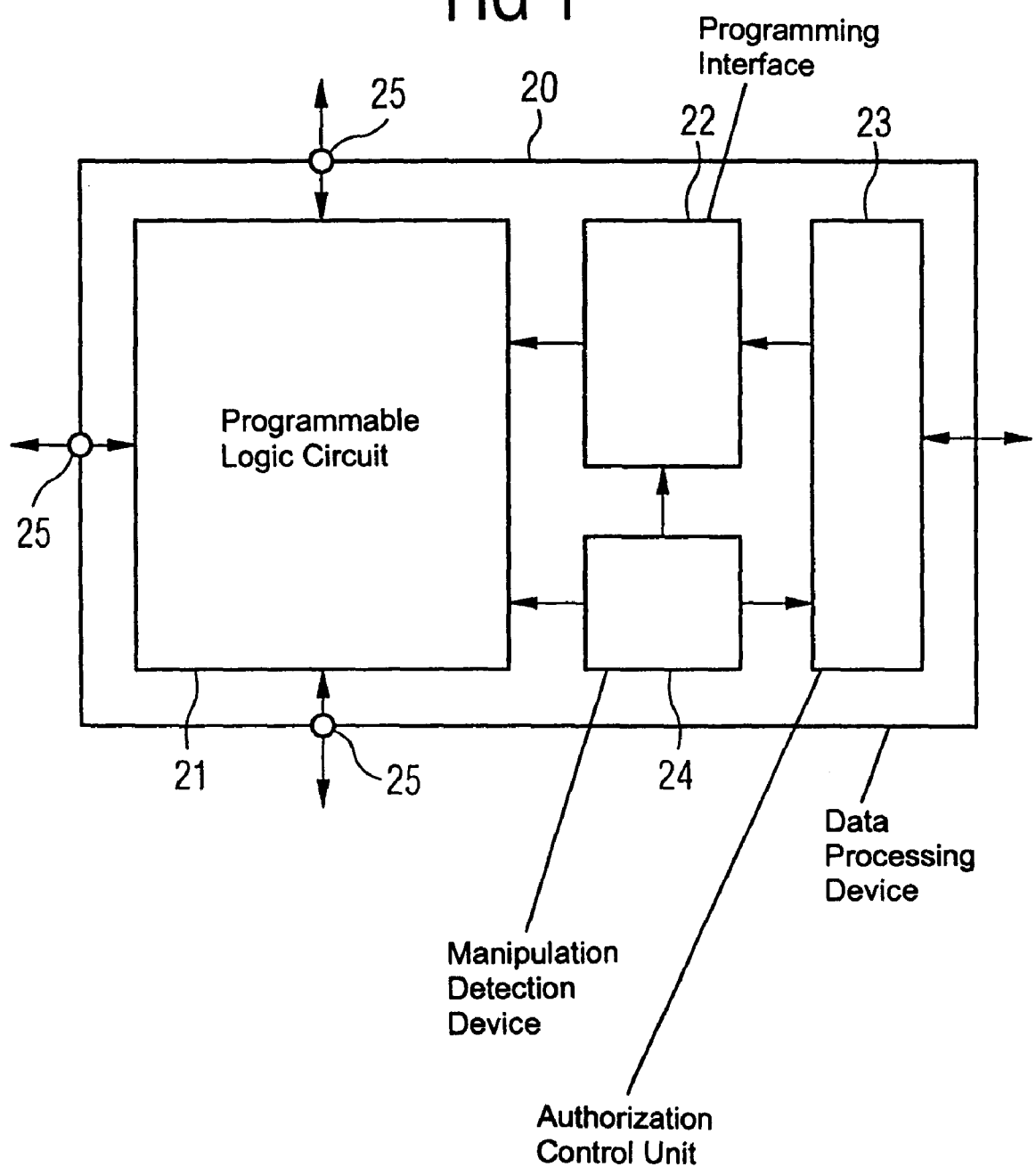
FIG. 1 is a diagrammatic illustration of a data processing device.

Referring now to the figures of the drawing in detail and first, particularly, to FIG. 1 thereof, there is a data processing device 20 that has a functionally programmable logic circuit 21 and an authorization control unit 23. An internal programming interface 22 is provided for programming or reprogramming the logic circuit 21. Access to this programming interface is protected by the authorization control unit 23. A programming operation can be executed only if a PIN has been entered correctly or, if a biometric sensor is used, when the biometric features have been positively compared with patterns stored in a memory.

An unauthorized entity could now attempt to obtain direct access to the programming interface 22 through a hardware manipulation, bypassing the authorization control unit 23. Therefore, a manipulation detection device 24 is additionally provided, which can identify such a hardware attack. Suitable reactions, for example, a message to a central control station or the erasure of safety-relevant data, are subsequently performed.

While a programming operation can only be effected via the authorization control unit 23, the normal accesses to the functions of the logic circuit 21 are possible via interfaces 25. In the same way, additional components can be directly connected to the logic circuit 21 using the interfaces 25.

An exemplary application of a data processing device in the form of a smart card is illustrated in FIG. 2, where the application is effected in conjunction with a decoder for Pay-TV applications.

The basic method of operation of pay-TV applications consists in encrypting the television signal in such a way that it cannot be displayed by the television set. The television signal is decrypted in a decoder, known as a so-called set-top-box. In order to be able to use the decoder for a specific program, the user must have a smart card, which is issued by the provider on payment.

For the technical realization, a so-called challenge value is transmitted in the blanking interval of the television signal and forwarded to the smart card by the decoder. In the smart card or in the microprocessor contained therein, a cryptographic algorithm is employed using a stored key to the challenge value and a response value is returned to the decoder. The latter can thereupon perform decryption of the television signal. The decoder is usually a standardized device, so that a plurality of pay-TV programs can be decrypted using different smart cards with the same decoder device.

Since the cards for decrypting a television program are identical for all users, it has proved lucrative for attackers to simulate the smart card functions with simulations and sell them. These simulations use conventional microprocessors and are often equipped with large parts of the original software of the pay-TV cards. The technical problem in preventing simulations stems from the fact that all cards of a system are functionally identical and can thus be simulated relatively easily.

It has previously been attempted to shorten the service life of an illegal card simulator by regularly changing the cryptographic key. However, more recent simulators allow the key to be changed via a keyboard or via a PC interface. The new keys in turn are disseminated via the Internet. A further approach for preventing the simulations is the integration of customer-specific modules or application specific integrated circuits (ASICs) as a second chip on the smart card module. However, these modules can likewise be simulated after a single reverse engineering process in hardware on a simulator.

The problems regarding the use of smart cards in pay-TV applications or telephone cards are explained in more detail in the journal "A la card", issue 26-27/97, page 315 et seq., where it is proposed to equip the smart cards with crypto-coprocessors in order thus to make a duplicate more difficult. Since their data throughput is high in comparison with an external logic which is used to simulate their functions, a duplicate can only be effected likewise using a crypto-coprocessor. Although this makes the duplicate more difficult, the prohibited simulation nonetheless remains lucrative on account of the large numbers.

The smart card 1, as illustrated in FIG. 2, for use with a pay-TV decoder has a microcontroller 2 and a functionally programmable hardware component 3, e.g. an FPGA. The microcontroller 2 forms a unit 4 with the functionally programmable hardware component 3. Moreover, a programming device 5 is provided for programming the functionally programmable hardware component 3. In normal operation, a television signal 10 is transmitted to the decoder 11. The television signal 10 contains both a data signal 12 for representing the television pictures and a challenge value 13, which, as described in the introduction, is forwarded to the smart card. The application of a crypto-algorithm to the challenge value 13 by the microcontroller and/or the functionally programmable hardware component yields a response value 14, which is returned to the decoder 11 and enables the latter, on the basis of a key function of the response value or a determination of initial values, to decode the data signal 12 and to forward it as video signal 15 to a television set.

FIG. 3 shows how the functionally programmable hardware component 3 is reprogrammed. In this case, together with the data signal 12, a programming command 16 is transmitted in the blanking interval, so that it remains unnoticed by the user. The decoder forwards the programming command 16 to the smart card, where the programming device 5 is thereupon addressed, which performs the reprogramming of the functionally programmable hardware component 3. The broadcasting corporation now has the opportunity to encrypt the television signal differently or to alter the challenge values, so that decoding is possible only by applying the reprogrammed function. If the reprogramming operation is carried out frequently, for example every hour, it is less practicable for attackers to analyze the new algorithm each time and to program an FPGA accordingly.

Furthermore, for directly simulating the pay-TV smart card, the attacker also cannot use a commercially available microcontroller, but rather would have to start an entire reverse engineering and also fabricate the unit 4 with the microcontroller 2 and the functionally programmable hardware component 3.

It goes without saying that the application of the data processing device is not restricted to pay-TV applications, but rather can be applied to all systems in which stringent requirements are demanded of programmability and safety.

We claim:

1. A data processing device, comprising:
    a functionally programmable logic circuit;
    a programming interface coupled to said functionally programmable logic circuit and configured to program said functionally programmable logic circuit;
    an authorization control unit coupled to said programming interface and configured to prevent an unauthorized access of said programming interface; and
    an interface configured to access functions of said functionally programmable logic circuit;
    a hardware manipulation detection device configured to detect manipulations on said functionally programmable logic circuit, said authorization control unit and said programming interface.

2. The data processing device according to claim 1, wherein said functionally programmable logic circuit is configured to execute a crypto-algorithm.

3. The data processing device according to claim 1, wherein said authorization control unit is realized by a microprocessor that can also be used for other tasks.

4. The data processing device according to claim 1, wherein said hardware manipulation detection device is configured to transmit a warning message to a central control station upon detection of a manipulation of said functionally programmable logic circuit, said authorization control unit or said programming interface.

5. The data processing device according to claim 1, wherein said hardware manipulation detection device is configured to erase safety-relevant data upon detection of a manipulation of said functionally programmable logic circuit, said authorization control unit or said programming interface.

* * * * *